May 1, 1962

W. LOTTER 3,031,948

BROILER

Filed March 30, 1959

INVENTOR.
WILLIAM LOTTER
BY
Wooding and Krost,
ATTORNEYS

May 1, 1962     W. LOTTER     3,031,948

BROILER

Filed March 30, 1959     3 Sheets-Sheet 2

INVENTOR.
WILLIAM LOTTER
BY

ATTORNEYS

May 1, 1962 W. LOTTER 3,031,948
BROILER
Filed March 30, 1959 3 Sheets-Sheet 3

INVENTOR.
WILLIAM LOTTER
BY

ATTORNEYS

United States Patent Office 3,031,948
Patented May 1, 1962

3,031,948
BROILER
William Lotter, Mentor, Ohio
(19200 Sunset Road, South Bend, Ind.)
Filed Mar. 30, 1959, Ser. No. 802,843
9 Claims. (Cl. 99—390)

My invention relates to broilers and the like for the cooking of food by broiling.

An object of my invention is to provide an improved apparatus for the broiling of food, such as meat, simultaneously on opposite sides thereof.

Another object is the provision of apparatus for obtaining fast and thorough cooking of food by simultaneously broiling opposite sides thereof by applying heat at adjustably determined distances therefrom.

Another object is the provision in a broiler for obtaining adjustment in the spacing of the heating members relative to the food being broiled.

Another object is the provision of ready means for varying the spacing of heating sources from opposite sides of food, such as meat, so as to obtain the desired direction and intensity of heat upon the food.

Another object is to simultaneously broil opposite sides of food, such as meat, while at the same time avoiding or minimizing the danger of grease or heated fat from the food or meat striking or falling upon a source of the heat.

Another object is the provision for so inclining the food to be broiled and the heating members disposed on opposite sides of the food as to obtain the maximum efficiency in broiling and at the same time to avoid or minimize the disadvantage and danger of particles of food or grease dropping down onto the heating source during the broiling operation.

Another object is the provision for disposing heating members on opposite sides of an inclined open grill upon which food is to be broiled so as to incline the heating members at acute angles to the vertical and for maintaining a parallel relationship between the heating members and the open grill while permitting individual adjustment of the spacing of the heating members from the grill.

Another object is the provision of an improved mechanism in a broiler for holding and moving heating members to desired positions relative to a grill.

Another object is the provision for improved structure in a grill for controlling the flow of grease or heated fat from the food or meat being broiled.

Another object is the provision of partitions or baffles in a broiler so arranged as to provide ventilation through the cabinet of the broiler and thus avoid overheating of the sides of the cabinet.

Another object is to provide improved apparatus for obtaining results not heretofore readily obtainable.

Other objects and a fuller understanding of my invention may be had by referring to the following description and claims, taken in conjunction with the accompanying drawings, in which:

Figure 1:
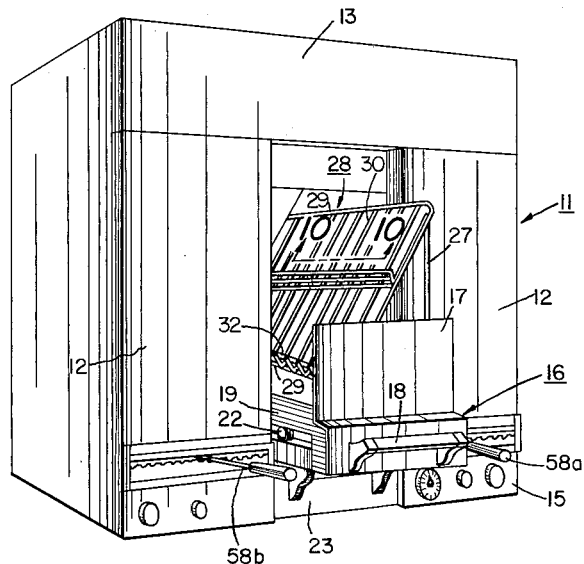
FIGURE 1 is a perspective view of a broiler embodying my invention.

My improved broiler is housed in a cabinet denoted generally by the reference character 11. There are two side door panels 12 which may be swung outwardly to expose the inner parts housed in the cabinet. There is also a top panel 13 which may be swung up or removed to expose the parts in the upper portion of the cabinet. An inner frame 14 supports the several parts of the broiler within the cabinet. This inner frame 14 has a supporting base 15 to which is secured the frame 14 and cabinet 11.

Figure 5:
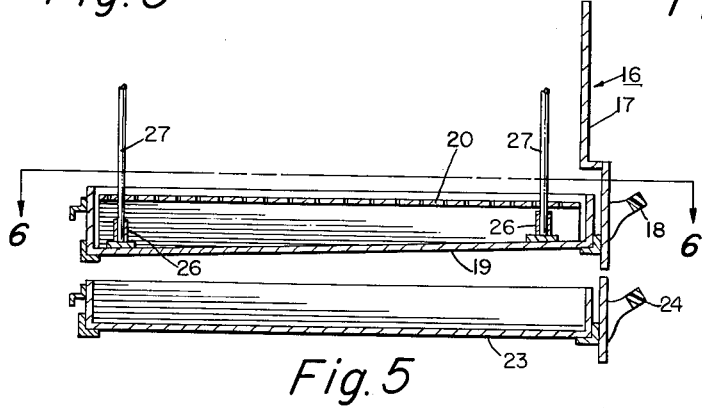
FIGURE 5 is an enlarged sectional view illustrating the mounting for the grill on the sliding rack in my broiler and looking in the direction of the arrows 5—5 of FIGURE 2.
Figure 6:
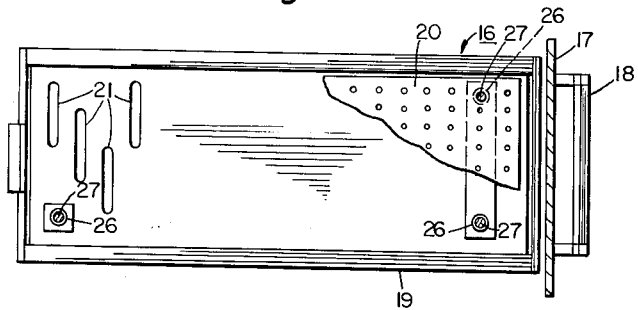
FIGURE 6 is a plan view showing the sliding rack upon which is mounted the grill of my broiler and looking in the direction of the arrows 6—6 of FIGURE 5.
Figure 7:
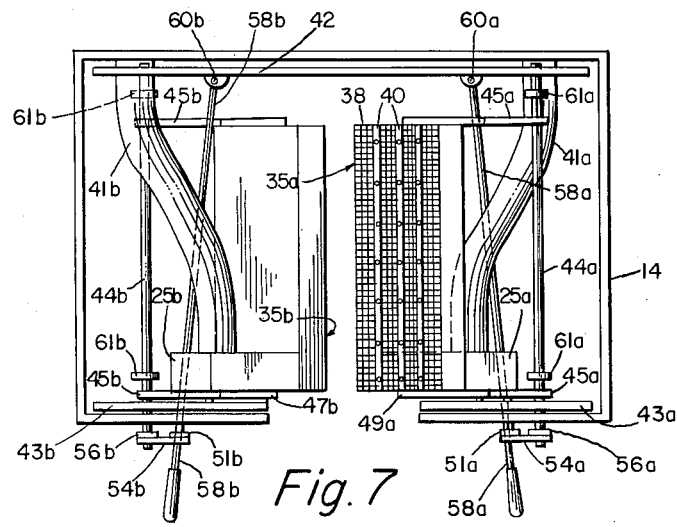
FIGURE 7 is a plan view of the apparatus showing the disposition of the parts and looking down on the view of FIGURE 2 but with certain parts removed for purposes of clarity of illustration.

Between the side panels 12 there is an open space and in the lower part of this open space there is positioned a sliding rack denoted generally by the reference character 16. This rack 16 has a front panel 17 which extends across the lower part of the space between the panels 12 when the rack 16 is in its inwardmost position. A bar handle 18 is attached to the rack 16 for manually moving the rack inwardly and outwardly on a roller bearing mechanism 22. As shown in FIGURE 5, the rack 16 has a bottom pan 19 which slopes downwardly at an incline to the horizontal as it extends to the rear of the cabinet. A perforated plate 20 is positioned above the bottom of the pan 19, as indicated, the perforations in the plate 20 allowing grease or other like substances to flow downwardly into the bottom of the pan 19. There are a plurality of slots 21 extending through the bottom of the pan 19 adjacent to the rearward end as shown in FIGURE 6. These slots 21 permit the grease or the like in the pan 19 to drop downwardly into a lower drip pan 23 positioned therebelow in the cabinet. The slots 21 are always over the pan 23, even when the pan 19 has been pulled outwardly on the roller bearing mechanism 22 to its most withdrawn position. Spaced roller bearing mechanisms on opposite sides of pan 19 (shown on one side in the view of FIGURE 1) carried by the cabinet 11 provide for supporting the pan and for its movement as a drawer in and out of the cabinet. Also the lower pan 23 is movable as a drawer in and out of the cabinet 11. Thus, there is always provision at all positions of the pan 19 for catching in the lower drip pan 23 the grease flowing downwardly from the bottom of the pan 19. When it is desired to remove the pan 23 from the cabinet, it may be slid outwardly by pulling the handle 24 attached to the front end of the lower drip pan 23.

The pan 19 has three socket supports 26 disposed therein and adapted to receive three upright rods 27, respectively. Carried upon the three rods 27 (two at the front part of the pan 19 and one at the rear of the pan 19) is a grill denoted generally by the reference character 28. The grill 28 has cross-pieces 29 which connect the opposite ends of up-and-down grill rods 31. Arranged parallel with and next adjacent to the up-and-down grill rods 31 are rods 30 welded or otherwise secured thereto.

Figure 10:
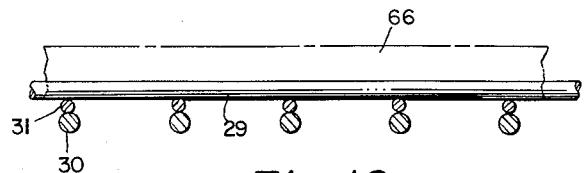
FIGURE 10 is an enlarged detailed view of a portion of the grill utilized in my broiler.

It is to be noted that the rods 30, which are disposed below and rearwardly of the rods 31, are larger in diameter than the rods 31, as seen in FIGURE 10. As the food, such as meat 66, rests upon the top surface of the smaller rods 31, grease dropping from the same tends to move downwardly and along the lower and rearward surfaces of the rods 31 and adjacent the rods 30. The construction of the grill having the larger rods 30 and the smaller rods 31 disposed as illustrated is such that grease or the like, instead of dropping vertically downwardly from the rack, tends to roll or flow down the rods 31 at their respective junctures with the rods 30. The grease or the like flowing down the longitudinal recesses formed by their junctures upon reaching the lower ends of the rods drips down into the pan 19. This structure facilitates the broiling of the food, such as meat, with heating members disposed on opposite sides thereof without grease and the like tending to fall vertically downwardly on to a heating member disposed directly below the food being broiled, with the resulting excess smoke, flame and odors.

Rods 33 extend along the up-and-down rear edge of the grill so as to aid in moving food outwardly with the grill when the rack 16 is slid outwardly of the cabinet. The rods being positioned to the rear of food on the grill engage the rear edge portion of food, such as a steak, if the food, through inertia, tends to remain in the cabinet when the rack 16 is moved forwardly. Bottom rods 32 extend along the bottom edge of the grill 28 so as to aid in supporting food upon the grill which lies at an incline against the rods 31 and is partially supported upon the bottom rods 32. As seen in FIGURE 1, an intermediate ledge, parallel to rods 32, is also provided for supporting food.

In order simultaneously to broil opposite sides of a piece of food, such as beefsteak, I provide two heating members, 35a on the right side and 35b on the left side. I incline the grill 28 at an acute angle to the vertical and intermediate of the heating members 35a and 35b. By reason of the inclination and spacing of the grill and heating members as shown, dripping of grease and the like downwardly on the heating member 35a is less than if the grill and heating members were horizontally disposed with heating member 35a directly below the grill 38. I dispose both heating members 35a and 35b in planes which are inclined at an acute angle to the vertical and substantially parallel to the plane of the inclined grill 28. The heating members are gas-fired so as to produce a flame at the front heating surfaces of the respective members directed toward the grill 28. A suitable combustible gas is brought in through flexible conduits (not shown) and connected to a mixing chamber 25a of the heating member 35a and to a mixing chamber 25b of the heating member 35b. Air from outside the cabinet is brought in through flexible conduits, conduit 41a for heating member 35a and conduit 41b for heating member 35b. The mixture of air and gas is fed into the respective heating members and uniformly discharged through the plurality of uniformly distributed openings in the perforate ceramic core 36 so that flame and resultant heat are generated at the faces of the respective heating members directed toward the opposite sides of the grill. A metal shell 37 surrounds the sides and rear of the ceramic cores 36 of the heating members. Suitable conduit means, not shown, are provided for introducing the mixture of air and gas to the interior of the respective heating members and communicating with the said openings in the cores 36.

Figures 8, 9:
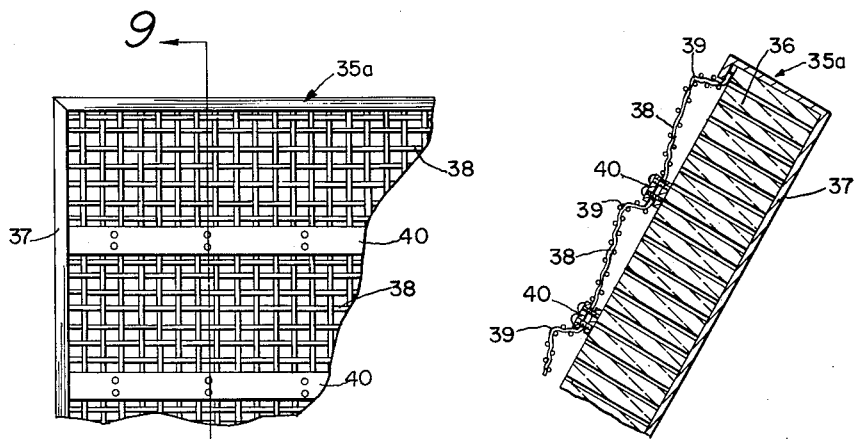
FIGURE 8 is a partial enlarged view of the face of one of the heating members used in my broiler.
FIGURE 9 is a cross-sectional view taken through the line 9—9 of FIGURE 8 and illustrating structure of one of the heating members utilized in my broiler.

Secured to the front face of each of the shells 37 over the front face of the respective ceramic cores 36 is a wire screen 38 of stainless steel or other suitable alloy adapted to be subjected to intense heat generated by the heating members. The wire screens 38 are bent along horizontal lines indicated at 39 in FIGURE 9. As seen in the drawings, the stepped and recurrently angular disposition of the screens because the gas flame tends to flow upwardly tends to make uniform the distribution of the heat at the face of the heating members relative to the vertical. As the heating members are inclined as shown and as the flame and heat generated at the face of the ceramic core tends to flow upwardly, the inclination of the major portion of the wire screen 38 relative to the flat face of the ceramic core 36 is such as to more uniformly distribute the heat over the face of the heating member. The wire screen as disposed is more in the plane of the upward flow of the gas flame. Where the flame would be the most concentrated by reason of the barrier of strips 40 and the upward flow of flame from orifices below, the screen is farthest removed from the face of the ceramic core. Metal strips 40 extending across the heating members secure the screen 38 to the heating members. In effect, there are a plurality of heating units arranged in side-by-side rows making up each of the heating members.

Figure 2:
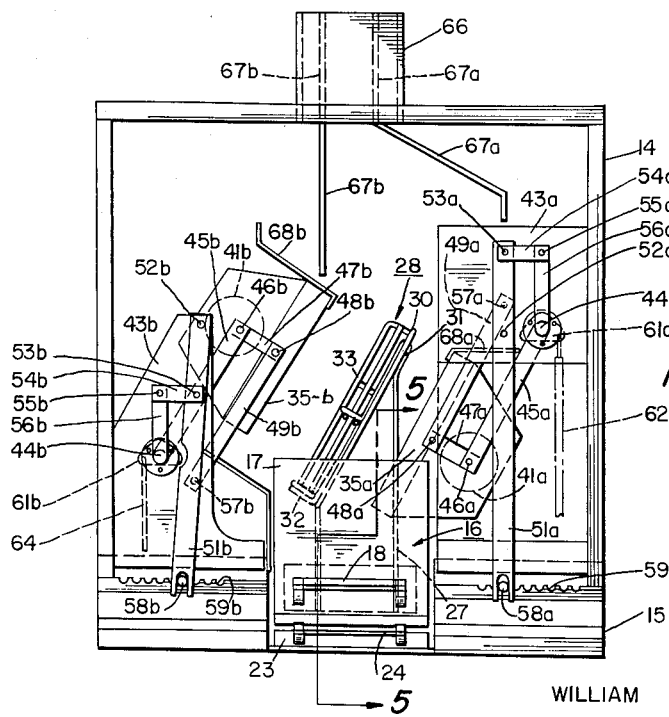
FIGURE 2 is a longitudinal sectional view of my broiler with the cabinet shown in FIGURE 1 removed to reveal the inner construction of the parts.

Carried by the frame 14 is a rear support 42 in the form of a vertically extending plate disposed near the rear wall of the cabinet. Adjacent the front of the frame and on the opposite sides of the front opening in the cabinet and rearwardly of the panels 12 are upright supports 43a and 43b, 43a being on the right side and 43b being on the left side. As seen in FIGURE 2, the support 43a is somewhat taller than the support 43b. The supports 42, 43a and 43b are carried by the base 15 of the frame 14.

Pivotally carried on the support 43a and the rear support 42 is a horizontal shaft 44a. Pivotally supported on the support 43b and the rear support 42 is a horizontal shaft 44b. The shaft 44a is at a higher elevation than the shaft 44b. The shafts 44a and 44b provide first pivot points for the support and movement of the mechanism supporting the heating members 35a and 35b, respectively. Rigidly carried on the shaft 44a is an arm 45a so disposed as to swing on the axis of the shaft 44a as the shaft 44a rotates. Rigidly carried on the shaft 44b is an arm 45b so disposed as to swing on the axis of the shaft 44b as the shaft 44b rotates.

At the free end of the arm 45a at a point removed from the shaft 44a is a pivot connection 46a. This pivotally connects a link 47a to the free end of the arm 45a. A pivot connection 48a at the outer end of the link 47a pivotally connects the link 47a to an arm 49a which is disposed substantially parallel to the arm 45a. The upper end of the arm 49a is pivotally connected to support plate 43a by means of a pivot connection 57a. The pivot connections 46a and 48a include pins carried by and protruding from the heating member 35a so that swinging of the arms 45a and 49a relative to the axes of the shaft 44a and pivot 57a moves the heating member 35a toward and away from the grill 28.

The upper end of the operating lever 51a is pivotally connected through a pivot connection 53a with a link 54a, which in turn is pivotally connected through a pivotal connection 55a with the upper end of an arm 56a rigidly connected to the shaft 44a. The lever 51a is pivotally carried by pivot connection 52a on support 43a so as to permit the lower end of lever 51a to swing to the right and left (as seen in FIGURE 2) upon the axis of the pivot connection 52a.

At the rear end of the heating member 35a, there is a similar parallelogram construction of arms 45a and 49a carried on shaft 44a and a pivot connection 57a, that are interconnected in the same way at their free ends by a link 47a and the heating member. The heating member is thus supported at its opposite ends to enable it to swing as described.

Although links 47a and 47b could be eliminated by using the housings of the heating elements alone for the same purpose, it is found most convenient for assembly and for assuring alignment of the parallel arms in the correct planes to add these links 47a and 47b to the assembly.

The lower end of the operating lever 51a, is notched as shown in FIGURE 2 to accommodate an adjusting rod 58a protruding through the fork of the notched end of the lever 51a. The rearward end of the adjusting rod 58a is connected by a swivel or loose connection 60a to the lower end of the support 42. The connection 60a is such that the rod 58a may be raised and lowered at its forward end and also swung in a horizontal plane. There is a detent bar 59a disposed at the front of the cabinet along the top of the base 15. This detent bar 59a is provided with a plurality of dwells disposed to accommodate the rod 58a in any one of the dwells as desired. By motion of the rod 58a upwardly and then laterally, the rod 58a may be swung in a horizontal direction and then upon release of the rod 58a it is held by gravity in a desired one of the plurality of dwells in the detent bar 59a. By reason of the interconnection of the operating lever 51a at its lower end with the rod 58a, the lever 51a is swung about the axis of the pivot connection 52a upon the swinging of the lower end of lever 51a by the rod 58a.

Figures 3, 4:
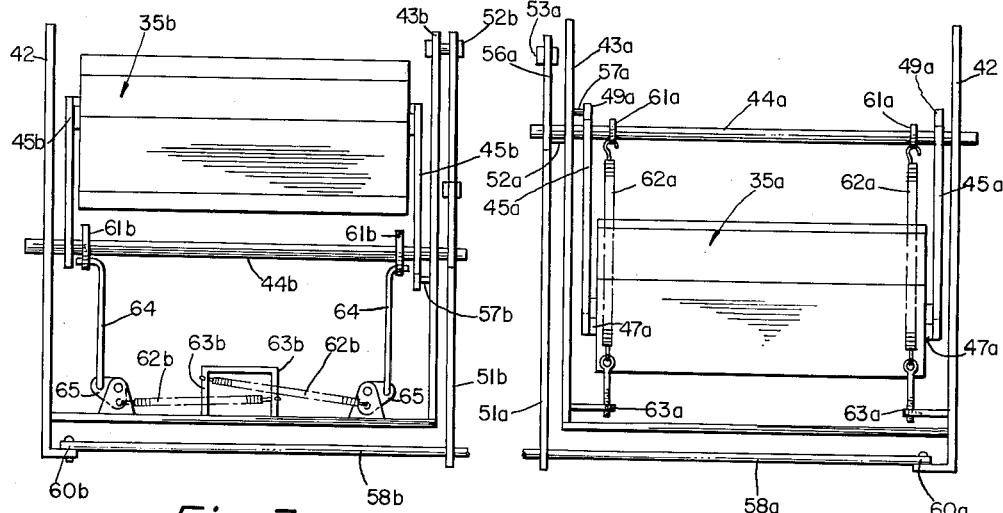
FIGURE 3 is a view showing the mounting of the left-hand heating member shown in FIGURE 2 and looking toward the left side of the apparatus as shown in FIGURE 2 but with certain parts removed for purposes of clarity of illustration.
FIGURE 4 is a view of the right-hand heating member shown in FIGURE 2 and looking toward the right side of the apparatus as shown in FIGURE 2 but with certain parts removed for purposes of clarity of illustration.

To counterbalance the weight of the heating member 35a to help hold the heating member 35a in desired location relative to the grill 28, there is provided a pair of coil springs 62a anchored at their lower ends by anchor connections 63a to the rearward support 42 and the forward support 43a as illustrated in FIGURE 4. The upper ends of the coil springs 62a are connected to short arms 61a rigidly connected to the shaft 44a. The tension of the springs 62a is such as to urge rotation of the shaft 44a in such a direction as to swing the arms 45a in an upward direction and hence to urge the heating member 35a toward the grill 28. The tension of the springs 62a, however, may be overcome by motion of the rod 58a to swing the lower end of the operating lever 51a in such a direction as to operate the parallelogram mechanism described as to move the heating member 35a downwardly and away from the grill 28.

On the left-hand side of the broiler, a somewhat similar arrangement is provided. Here, however, the heating member 35b is disposed at a higher level than the grill 28 and the weight of the heating member tends to move the heating member toward the grill instead of away from it, as was the case with the right-hand heating member 35a. Rigidly attached and extending from the left-hand shaft 44b is an arm 45b. The upper or free end of the arm 45b is pivotally connected by a pivot connection 46b to the heating member 35b and to a short link 47b, the pivot connection 46b including a pin carried by the heating member 35b and protruding through link 47b. The forward end of the short link 47b is pivotally connected by pivot connection 48b both to the heating member 35b and to the upper end of arm 49b. The lower end of the arm 49b is pivotally connected by pivot connection 57b to support plate 43b. Arms 45b and 49b are substantially parallel to each other and provide a parallelogram mechanism with the link 47b just as do the arms 45a and 49a with the link 47a.

The upper end of the operating lever 51b is connected by a pivot connection 52b to the upper end of the support 43b in such manner that the lower end of the operating lever 51b may swing to the right and left (as seen in FIGURE 2) upon the axis of the pivot connection 52b.

Connected to the operating lever 51b at a point intermediate the pivot connection 52b and its free lower end is a short link 54b connected by a pivot connection 53b. The other end of the short link 54b is connected by a pivot connection 55b to the upper end of an arm 56b rigidly connected to and extending from the shaft 44b. Swinging of the operating lever 51b thus tends to rotate the shaft 44b and to swing arm 45b and arm 49b to obtain a parallelogram action as in the case of the mechanism on the right-hand side of the broiler apparatus. A similar parallelogram structure of arms 45b, 49b and link 47b is mounted in like manner to the rear end of heating member 35b.

The lower end of the operating lever 51b is forked to accommodate within the notch of the fork the forward end of an adjusting rod 58b. The rearward end of the adjusting rod 58b is connected by a swivel or loose connection 60b to the rear support 42 to permit the rod 58b to be raised and lowered at its forward end and also to be swung in a horizontal plane. A detent bar 59b has a plurality of dwells extending thereacross for accommodating in any desired dwell of the plurality of dwells the rod 58b. By raising of the forward end of the rod 58b, it may be swung to the right or left to a desired position and this, in turn, swings the lower end of the lever 51b to desired position. Upon release of the forward end of the rod 58b, it falls into one of the dwells of the detent bar 59b and thus retains the whole parallel mechanism in a desired location.

To oppose the weight of the heating member 35b, there are provided a pair of coil springs 62b anchored at one of their ends by anchor connections 63b and having their free ends connected to crank arms 65, as shown in FIGURE 3. The other ends of the crank arms 65 are connected by links 64 to short arms 61b rigidly connected to and extending from the shaft 44b. The tension of the springs 62b is such as to urge the links 64 downwardly and thus to rotate the shaft 44b in such a direction as to urge the heating member 35b upwardly and away from the grill 28. This tension of the springs 62b may be opposed by the swinging of the lower end of the lever 51b and locking it in position by means of the rod 58b in a selected dwell of the detent bar 59b.

It is to be noted that by the mechanism described, the faces of the heating members 35a and 35b through which the flame and heat are generated by the burning gas, are directed toward opposite sides of the open grill 28. These heat-generating faces are disposed in flat planes disposed substantially parallel to the grill 28 and substantially parallel to each other. By means of the mechanism described, one of the heating members independently may be moved toward and away from the grill 28 while substantially maintaining the same parallel relationship. One of the heating members may be moved closer to the grill than the other, if desired. The heating members may be moved closer to the grill when it is desired to broil the food more quickly and may be moved away from the grill when slower cooking action is desired. Great flexibility is provided in getting the kind and speed of broiling action desired. By the arrangement shown, both sides of the food, such as a steak, may be simultaneously broiled between opposed heating members and at the same time grease and the like may be largely prevented from falling downwardly upon the lower heating member 35a. As is well known, the falling of such substances upon the flame or heat generating surfaces of the heating member causes undesirable flaming, smoking and odors.

To keep the inside of the cabinet cool adjacent the outer walls thereof, a ventilating system is provided. The cabinet is open at the front and rear and just above the base 15 as illustrated, for example, in FIGURES 1 and 2. Air may readily move into the cabinet at the front and rear thereof at the lower level and along the opposite sides of the cabinet. This air may then move upwardly in the cabinet, rearwardly of the respective heating members 35a and 35b. A fixed baffle 67a is carried by the cabinet and extends upwards and over into a flue 66 leading from the cabinet 11. This flue 66 may be connected to a chimney or to other venting means through which fumes and exhaust gases from the broiler may be discharged. Thus, air moving into the lower end of the cabinet on the right-hand side and rearwardly of the heating member 35a moves upwardly in the cabinet and thence is baffled over by the fixed baffle 67a and up into and through the flue 66. A baffle plate 68a is connected to the upper end of the heating member 35a so as to be movable therewith, this baffle plate 68a extending on a substantially horizontal plane. By the combination of the movable baffle plate 68a and fixed baffle 67a, air is so guided rearwardly of the heating member 35a as to induce a movement of air which aids in keeping the interior of the cabinet, rearwardly of the heating member 35a, relatively cool.

There is also a fixed baffle 67b extending up into the flue 66, as illustrated in FIGURE 2. A baffle plate 68b is carried by the upper end of the heating member 35b so as to be movable therewith. By the combination of the fixed baffle 67b and baffle plate 68b, air entering the lower end of the cabinet on the left-hand side, as seen in FIGURE 2, tends to move upwardly in the cabinet to the rear of the heating member 35b and hence is guided out and up through the flue 66. This movement of the air along the side wall of the cabinet to the rear of the heating member 35b tends to provide for relative coolness of the interior of the cabinet rearwardly of the heating member 35b.

It is to be understood that the flexible conduits 41a and 41b open outwardly of the cabinet so as to take in fresh air from outside the cabinet and lead it to the respective mixing chambers 25a and 25b of the heating members 35a and 35b. It is also to be understood that there are flexible conduits which bring heating gas from outside the cabinet to the respective heating members 35a and 35b where the gas is mixed in the chambers 25a and 25b with the air brought through the conduits 41a and 41b. To simplify the illustration, the flexible conduits which deliver the gas have not been shown in the drawings. Valve handles located at the front of the base 15, as seen in FIGURE 1, independently control the flow of gas to each of the heating members. A pilot flame controlled by an independent valve is also provided for each of the heating members. A thermometer showing the temperature within the broiler has a dial showing on the front of the base 15, as seen in FIGURE 1.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A broiler comprising the combination of a grill for supporting food to be broiled and exposing opposite sides thereof, a support holding said grill in a plane inclined at an actute angle to the vertical, a pair of heating heads disposed on the opposite sides of said grill and in planes inclined at actute angles to the vertical, the planes of said grill and heating heads being generally parallel to each other, said heating heads being disposed to direct heat therefrom towards said grill to broil opposite sides of food supported on said grill, a first supporting mechanism for supporting a first of said heads, a second supporting mechanism for supporting a second of said heads, said supporting mechanisms each including a pivot support, a hinged parallelogram structure pivotally carried by the pivot support and carrying the respective heating head, an operating lever for swinging the parallelogram structure, biasing means opposing the force of gravity on said heads, and locking means for selectively locking the respective mechanism in position to hold the head carried thereby at desired positions against movement by the force of gravity and the bias of said biasing means, said mechanisms providing for the selective spacing of said heads relative to the sides of said grill, while substantially retaining the parallel relationship of the plane of said heads to the plane of said grill, to obtain the desired application of heat on opposite sides of said grill.

2. A broiler comprising the combination of, a grill for supporting food to be broiled, said grill having opposite sides open for exposing opposite sides of said food, a pair of heating members disposed on opposite sides of said grill for directing heat toward said grill for broiling food supported thereon, a first supporting mechanism for supporting a first of said heating members, a second supporting mechanism for supporting the second of said heating members, each of said supporting mechanisms comprising a pivot support, a parallelogram structure carried by the pivot support, an actuating arm operatively connected to the parallelogram structure for swinging said parallelogram structure on said pivot support, and pivot connection means between said heating member and said parallelogram structure, said supporting mechanisms providing for movement of the respective heating members toward and away from said grill upon movement of the actuating arm while maintaining substantially parallel positions of the heating members relative to said grill, and means for selectively holding the respective supporting mechanisms in desired position for maintaining the heating members in desired spaced relationship to said grill.

3. In cooking apparatus, the combination of a holder for food to be cooked, a pair of heating members positioned on opposite sides of and facing said holder to apply heat to opposite sides of food held thereby, and a pair of mechanisms each for supporting and moving said heating members relative to said holder, each said mechanism including a pair of parallel arms pivotally connected at spaced locations to a respective heating member, a first pivot supporting pivotally supporting one of said parallel arms at a distance from its pivotal connection with said heating member, a second pivot support, an actuating arm pivotally carried on said second pivot support for moving the parallel arms relative to said first pivot support, and a pivot connection between said actuating arm and the other of said parallel arms at a distance from its pivotal connection with said heating member and at a distance from said second pivot support, the swinging of a said actuating arm on said second pivot supports swinging said parallel arms relative to the first pivot support to move the heating member carried by the parallel arms toward and away from said holder while maintaining successive positions in substantially parallel planes.

4. Apparatus as claimed in claim 3, and including first and second biasing means each biasing one of said mechanisms independently of the other to urge the heating member supported thereby to move relative to said holder.

5. Apparatus as claimed in claim 4, and including first and second holding means each adapted to hold in selected position one of said mechanisms independently of the other to hold the heating element supported thereby against the bias of the respective biasing means in desired position relative to said holder.

6. In a broiler, the combination of a grill for supporting food to be broiled in a substantially flat plane, a pair of heating members disposed on opposite sides of said grill and directed toward said grill to heat opposite sides of food supported on said grill, said grill and heating members being disposed in planes spaced from each other and generally parallel to each other, a pair of supporting mechanisms supporting said heating members, respectively, in position on opposite sides of said grill, each of said supporting mechanisms comprising a pair of spaced parallelogram structures, pivot supporting means having a common axis for pivotally supporting said structures to provide for the pivotal swinging of said structures on said common axis, an actuating member for pivotally swinging said structures on said pivot supporting means, mounting means mounting the heating member to said structures to maintain an angular relationship to said structures, and holding means for holding the supporting mechanism in selected alternate positions, the said supporting mechanisms providing for the movement of said heating members to selected locations toward and away from said grill and the maintenance of the heating means in planes generally parallel to the plane of said grill.

7. The combination as claimed in claim 6, and in which the planes of said grill and heating members are inclined at acute angles to the vertical, and including biasing means for opposing the tendency of the weight of said heating members on said supporting mechanisms to swing said structures on said pivot supporting means.

8. In a broiler, the combination of a base disposed in a reference plane adapted to be supported on and parallel to a horizontal supporting surface, a grill carried by said base disposed in a plane inclined at an acute angle to said reference plane and to the vertical for supporting food to be broiled at an incline to said supporting surface, a pair of heating members carried by said base disposed in planes on opposite sides of said grill and directed theretoward for broiling said food supported on said grill, said heating members being disposed in planes generally parallel to the plane of said grill, first means carried by said base for moving said heating members toward and away from said grill to selected positions relative thereto, second means carried by said base for substantially maintaining said heating members in planes generally parallel to the plane of said grill in all locations to which moved by said first means, third means carried by said base operatively connected to said first and second means for biasing one of said heating members toward said grill and for biasing another of said heating members away from said grill to oppose the respective effect of the weights of both of said heating members, and fourth means carried by said base for holding said first means in desired positions to hold respective heating members in selected locations relative to said grill.

9. In a broiler, a cabinet, said cabinet having ventilating openings in the lower portion thereof for admitting air and an outlet in a lower portion thereof, a grill supported in said cabinet and disposed in a plane inclined at an acute angle to the vertical, a pair of heating members disposed on opposite sides of said grill and having heat generating sides directed toward opposite sides of said grill to simultaneously broil both sides of food on said grill, said heating members being disposed in planes generally parallel to each other and to the plane of said grill, a pair of supporting mechanisms mounted in said cabinet for supporting said heating members, respectively, each said supporting member including pivoted parallel arms connected to said heating member and arranged to support the heating member and to guide movement thereof relative to the grill and to maintain the heating member in planes generally parallel to the plane of said grill, and baffle means disposed to guide air entering the cabinet through said ventilating openings upwardly and rearwardly of said heating members opposite the heat generating side of each heating member toward said outlet, said baffle means having a portion carried by said cabinet and a portion carried by said heating members to guide said air in various of the positions of said heating members.

References Cited in the file of this patent
UNITED STATES PATENTS

| | | |
|---|---|---|
| 570,957 | Richards | Nov. 10, 1896 |
| 735,331 | Adams | Aug. 4, 1903 |
| 850,654 | Jones | Apr. 16, 1907 |
| 1,510,547 | Ferrari | Oct. 7, 1924 |
| 1,810,843 | Moecker et al. | June 16, 1931 |
| 1,955,867 | Wilkie | Apr. 24, 1934 |
| 2,335,217 | Tate | Nov. 23, 1943 |
| 2,520,816 | Sherman | Aug. 29, 1950 |
| 2,915,959 | Stott | Dec. 8, 1959 |